United States Patent
Takayama et al.

(10) Patent No.: US 6,522,301 B2
(45) Date of Patent: Feb. 18, 2003

(54) ABOVE DECK UNIT FOR AUTOMATIC IDENTIFICATION SYSTEM

(75) Inventors: Masaki Takayama, Mitaka (JP); Naoki Yokoyama, Mitaka (JP); Masanori Haga, Mitaka (JP); Naohisa Goto, Hachioji (JP)

(73) Assignee: Japan Radio Co., Ltd., Tokyo (JP)

( * ) Notice: Subject to any disclaimer, the term of this patent is extended or adjusted under 35 U.S.C. 154(b) by 0 days.

(21) Appl. No.: 09/972,581

(22) Filed: Oct. 5, 2001

(65) Prior Publication Data

US 2002/0050952 A1 May 2, 2002

(30) Foreign Application Priority Data

Oct. 27, 2000 (JP) ........................................ 2000-328039

(51) Int. Cl.[7] ............................ H01Q 1/34; H01Q 21/28
(52) U.S. Cl. ........................................ 343/709; 343/725
(58) Field of Search ................................ 343/709, 710, 343/700 MS, 900, 725, 885, 724, 726, 727, 728

(56) References Cited

U.S. PATENT DOCUMENTS 4,329,690 A * 5/1982 Parker ........................ 343/709
5,491,483 A * 2/1996 D'Hont ........................ 342/42

FOREIGN PATENT DOCUMENTS

| JP | 06118158 A | 4/1994 |
|---|---|---|
| JP | 06194193 A | 7/1994 |
| JP | 06249939 | 9/1994 |
| JP | 06-82587 | 11/1994 |
| JP | 06-825587 | 11/1994 |
| JP | 07055911 A | 3/1995 |
| JP | 07084027 A | 3/1995 |
| JP | 07221947 A | 8/1995 |
| JP | 10247815 A | 9/1998 |
| JP | 11326511 A | 11/1999 |
| JP | 11331110 A | 11/1999 |
| JP | 2000103391 A | 4/2000 |
| JP | 2000195000 A | 7/2000 |

* cited by examiner

Primary Examiner—Don Wong
Assistant Examiner—James Clinger
(74) Attorney, Agent, or Firm—Samuels, Gauthier & Stevens, LLP

(57) ABSTRACT

An above deck unit for an AIS (automatic identification system) is externally installed on a ship. The above deck unit includes a radio circuit and an associated antenna for transmitting and receiving a message, a position detector and an associated antenna, associated controller and power supply, and a container for storing these elements. An inboard transmission path, e.g., a cable, connects the outdoor unit for the AIS and an AIS display serving as an interface means for the crew. A signal to be transmitted through the inboard transmission path is a processed, for example, an amplified signal, rather than an unprocessed output of a VHF antenna. Therefore, problems of signal loss or degradation along the inboard transmission path are unlikely to occur. Because the unit is incorporated within a single container, it can easily be installed and transferred. With this antenna complex, it is also possible to suppress interference between antennas.

19 Claims, 10 Drawing Sheets

ABOVE DECK UNIT FOR AUTOMATIC IDENTIFICATION SYSTEM

BACKGROUND OF THE INVENTION a) Filed of the Invention

The present invention generally relates to shipborne facilities for an automatic identification system (AIS). More specifically, the present invention relates to an ADE unit for an AIS, i.e., an outdoor unit capable of being used as an ADE which together with BDE constitutes the shipborne facilities for the AIS.

b) Description of the Related Art b1) Introduction

As disclosed in the Japanese Patent Laid-Open Publication Nos. H11-326511 and H11-331110, the AIS is a system aimed to contribute to safe and efficient navigation of a ship. To achieve this, the AIS serves to automatically receive/transmit radio messages including static and dynamic information between ships or between a ship and a coast station. In general, the static information contained in a message would not be changed merely by the movement of the ship that originates the message or by the elapse of time. The static information includes items of information useful for identifying the ship that originates the message, such as vessel name, IMO (International Maritime Organization) number, call sign, and so on. The static information also includes other information relating to the character and schedule of the current voyage of the ship originating the message. This information may include the likes of length, width, type, draft, destination, cargo, etc. of the ship. Unlike the static information, the dynamic information including the current position (e.g., longitude and latitude), speed of the ship changes over time and as the ship moves.

The AIS consists of coast facilities installed at coast stations and shipborne facilities mounted on individual ships. To realize ship-to-ship and ship-to-coast station automatic radio messaging, the shipborne facilities must include the following devices.

First, a circuit and an antenna for performing and controlling communications of radio messages are required.

Second, a means for providing a crew of a ship, on which the facility is installed, with static and dynamic information concerning their ship and other ships is necessary. This can be implemented by various display devices, e.g., a CRT and an LCD, and audio output devices including a speaker, a speech synthesizer, and so on.

Third, a means for setting the static information concerning the ship may be necessary. This can be implemented by independent input devices, e.g., a keyboard and a pointing device, or other input devices associated with the display device, such as an operation panel provided on or beside the screen of the display device.

Fourth, a means for obtaining the dynamic information of the ship by way of, for example, measurement may also be needed. Examples of devices used for this purpose include a wireless positioning device, which is best represented by a GPS (global positioning system) receiver, and various sensors, such as a gyrocompass, a log, or the like. Alternatively, another GNSS (global navigation satellite system) may be used in place of, or together with the GPS. The GPS or the GNSS to be used may be supported by terrestrial or satellite supplemental signals. One example is a DGPS (differential GPS) which provides a differential function using a supplemental signal. An SBAS (satellite based augmentation system), which is one type of DGPS designed to have functions of ranging, differential, and integration using satellite signals, may also be used.

b2) Shipborne Facilities

FIGS. 13 and 14 show an example arrangement of conventionally developed shipborne facilities. In the figures, the above deck equipment(ADE) consists of an antenna and its peripheral devices, while the below deck equipment (BDE) includes devices installed in the residential area or workspaces, such as the pilothouse, of the crew. In the figures, a broken line represents the conceptual border line between the ADE and the BDE. A similar line is used in FIGS. 1 and 12 which will be described later.

In the example shown in FIG. 13, the ADE includes a GPS antenna for PPS (pulse-per-second) 10a, a VHF antenna 10b, and a GPS antenna for positioning 30a. The example shown in FIG. 14 further includes a long range antenna 50a.

In the example shown in FIG. 13, the BDE includes an AIS transponder 10, an AIS display device 20, and a GPS receiver for positioning 30. The example shown in FIG. 14 further includes a long range aiding device 50 and an associated interface 50b, and a gyrocompass 60 and an associated interface 60a.

As can be seen, various transmission lines are provided between places where the ADE and the BDE are provided, to connect between the ADE and the BDE.

The AIS transponder 10, which belongs to the BDE, includes a VHF radio circuit 10c, a controller 10d, and a GPS receiver for PPS 10e, as shown in FIG. 15. It also has a power supply or the like which is not shown. The VHF radio circuit 10c carries out the above-mentioned messaging and consists of a TDMA transmitter 10f, a TDMA receiver 10g, a DSC receiver 10h, and other components. The TDMA transmitter 10f and the TDMA receiver 10g are circuits for receiving and transmitting the message according to the TDMA (time-division multiple-access) method. The TDMA transmitter 10f uses the VHF antenna 10b to transmit both static and dynamic information concerning the ship on which the AIS transponder 10 is installed to other ships or to coast stations. The TDMA receiver 10g uses the VHF antenna 10b to receive from other ships static and dynamic information concerning them. In addition, the DSC receiver 10h uses the VHF antenna 10b to receive DSC (digital selective calling) calls to the ship. It should be noted that, although for the sake of simplicity of drawing, each of the transmission and receiving functions is represented by a single block, additional transmission and receiving systems would be provided as needed in practice according to international law or protocol.

The controller 10d controls transmitting/receiving operations of the VHF radio circuit 10c as described below. First, when the TDMA receiver 10g installed on a first ship receives static and dynamic information concerning, e.g., of another ship, the controller 10d correspondingly causes the TDMA transmitter 10f to transmit the static and dynamic information concerning the first ship. To succeed in this messaging operation, synchronization in terms of timing of TDMA time slot must be established between the two ships. To do this, the GPS receiver for PPS 10e uses the GPS antenna 10a to receive a navigation message from a GPS satellite which is in orbit around the earth and, based on received data, derive a reference clock to generate a PPS signal. According to the PPS signal supplied from the GPS receiver for PPS 10e, the controller 10d controls the operation of the VHF radio circuit 10c to synchronize the operation of the VHF radio circuit 10c, such as the timing of the TDMA slot, with that of other ships. To secure a precise reference clock, the signal path connecting the GPS receiver for PPS 10e and the controller 10d should be as short as possible in order to suppress any delays along the signal path. In consideration of this, the receiver for PPS 10e is installed inside the AIS transponder 10.

The controller 10d receives the static and dynamic information concerning its own ship and supplies this information to the TDMA transmitter 10f to be delivered to other ships. The static information concerning the ship is set in advance in the hardware of the controller 10d, or stored therein in a nonvolatile manner. Alternatively, it may also be possible for a crewmember or some other person to set such information at a particular time before departure of the ship, by operating an operation section associated with the AIS display 20. The operation section may be formed by such devices as buttons beside the display screen, a touch panel on the screen, or an associated keyboard. Pieces of the dynamic information of the ship regarding the current position (latitude and altitude), the sailing speed of the ship, etc. can be obtained from the GPS receiver for positioning 30. The GPS receiver for positioning 30 receives a signal from a GPS satellite using the GPS antenna 30a and, based on the received information, carries out predetermined positioning operations. The information concerning the heading of the ship, which is included in the dynamic information, may be obtained from the gyrocompass 60. Various sensors and devices, including ones not described herein, can be used to acquire the dynamic information. If the GPS receiver for PPS 10e serves as the GPS receiver for positioning 30, the external GPS receiver may be eliminated.

The controller 10d displays on the screen of the AIS display 20 items of information corresponding to the static and dynamic information concerning other ships received by the TDMA receiver 10g from other ships or the like, preferably alone with static and dynamic information concerning the ship on which the AIS transponder 10 is installed. In principle, various feasible display styles include the likes of marking positions of other ships on the screen according to a two-dimensional coordinate system; displaying near the marked positions static information, such as the name of the ship, or the dynamic information, such as the heading of the ship; plotting the trail of other ships by accumulating and correlating previously obtained pieces of dynamic information; superimposing a radar image obtained from a radar device (not shown); superimposing an electronic chart for an ECDIS (Electronic Chart Display and Information System) retrieved from a storage device (not shown); displaying positional relationships between the ship and other ship, or between other ships, using auxiliary lines; and so on.

Other displaying styles have been devised, such as those disclosed in, for example, the Japanese Patent Application No. 2000-89902 filed with the Japanese Patent Office by the same applicant as the present application, and which is incorporated herein by reference. It should be noted that, although the AIS display 20 is preferably a dedicated display device, it is in principle possible to realize the AIS display 20 by conversion of, or in combination with, other display devices, including those for radar, ECDIS, a plotter, or the like. The AIS display 20 can also display the information received by the DSC receiver 10h or the long range aiding device 50. Examples of the long range aiding device 50 are communication devices for INMARSAT-C which is the service provided by the INMARSAT (International Mobile Satellite Organization), and other communication devices for data communications/positioning service operated by ORBCOMM (Orbital Communications Corp.).

b3) Problem

Although the shipborne facilities for the AIS have been reviewed and analyzed heretofore and many improvements have been proposed, problems remain.

First, the above-described shipborne facilities use cables or the like to connect between the ADE and the BDE. Depending on the size and the structure of the ship on which the facilities are to be installed, and on the positional relationship between the ADE and the BDE, the length of the cable could be such that attenuation loss can not be ignored. In particular, for example, a VHF antenna generally does not have an internal RF (radio frequency) amplifier, and this tends to cause a first problem of loss or degradation of the cable. Further, because the cables pick up noise, a second problem is that noise is more apparent appears when the cables are long (a second problem).

In the above-described shipborne facilities for the AIS, there is a third problem that multiple antennas and cables, and the associated labor and laborers for fitting out the ship, are required when introducing the shipborne facilities for the AIS, which complicates the installation. Depending on the relative positional relationships of respective antennas, interference or dead zone can occur in the transmitting/receiving output of each antenna, which is a fourth problem.

Further, in a case where the BDE devices such as the AIS transponder and the AIS display are transferred from one ship to another ship, work such as cutting the cable connection between the ADE with the BDE on the first ship, transporting to and installing on the second ship the removed BDE, and connecting the BDE with the ADE which is already installed on the second ship, is necessary. This makes it very difficult to adopt a portable, efficient, and economical usage style, such as the time sharing of a single BDE by several ships which do not sail simultaneously, which is a fifth problem. Also, there is a sixth problem in that there is increasing possibility of an error in cable connection when introducing or transferring BDE devices, because multiple cables are usually used for the connection of the ADE and the BDE.

In addition to the ADE side, the BDE side also has problems. First, multiple devices must be installed for the BDE, including the AIS transponder for communicating messages, an interface means for the crew, such as the AIS display, which provides information to the crew or is a setting means used by the crew; a positioning device, such as a GPS receiver, for acquiring dynamic information concerning the ship; and so on. Further, a large space is required in which to install these devices, and cable wiring associated with these devices also requires a large space. When introducing the shipborne facilities for the AIS to a relatively small ship having limited onboard space, the large volume requirement of the devices and cables is a seventh problem. An eighth problem is that it is bothersome to wire cables for connecting respective devices of the BDE.

It is possible to eliminate the external GPS receiver by allowing the internal GPS receiver for PPS stored in the AIS transponder to be used for positioning, especially by acquiring certification and authorization from a particular authority in charge, whereby the space to be occupied by the BDE and the associated cables can be reduced. It is also possible, in principle, to integrate the AIS transponder with the AIS display to form the BDE which is to be called an integrated AIS display transponder. This alleviates the inconvenience of laying cables in the BDE. However, such an integrated AIS display transponder results in a large volume apparatus, leading to a ninth problem of difficulty in transportation and installation.

With either multiple devices or large devices, there is a tenth problem in that it is difficult to mount the AIS facilities on a small floating device, such as a buoy. When connecting with the long range aiding device or the gyrocompass, it is necessary to also provide for each device an interface in order to compensate for different specifications. This not only enlarges and complicates the structure, but also increases the difficulty of wiring, creating an eleventh problem.

SUMMARY OF THE INVENTION

The present invention is directed to reducing loss or degradation of signals traveling through cables; to improving the anti-noise characteristic of the cables; to reducing the number of steps, cost, and space required for laying, transferring, and wiring cables and instances of erroneous wiring; to preventing occurrence of interference and dead zone among antennas; and to realizing downsizing, integration, a wider range of installable ships, and an extended facility usage.

To achieve the above objects, the present invention is based on a novel basic concept for constituting the shipborne AIS facilities. Specifically, heretofore proposed and developed shipborne AIS facilities are constituted according to a basic frame and design concept in which most of the facilities are installed as the BDE, and the BDE is the connected with the ADE through cables or the like. To solve the above-described problems attributable to such a basic frame concept, the present invention boldly abandons such a basic frame concept, which is common practice, and perhaps even "common sense", to those who practice the art. The present invention provides an apparatus capable of being "an outdoor unit for the AIS" or "an ADE unit for the AIS" by unitizing the elements belonging to the ADE in accordance with a particular configuration. Essentially or additionally, the ADE unit for the AIS according to the present invention has characteristics as described below.

First, the ADE unit for the AIS according to the present invention is used in the AIS. The AIS is a system for automatically messaging in a wireless manner static information, such as the name of the ship, and dynamic information, such as the current position of the ship between ships or between a ship and a coast station. The ADE unit for the AIS according to the present invention forms a part of the shipborne facilities to be mounted on a ship. The ADE unit according to the present invention is externally installed on a ship to enable communication with other ships or the coast station. Here, externally installed primarily refers to being installed on an area of the ship exposed to the environment, such as a deck, but also includes semi-exposed spaces under a cover or a deckhead. In addition, the ADE unit for the AIS according to the present invention provides information to be supplied to the crew via a wired or wireless inboard transmission path to the interface means for the crew. The interface means for the crew may be a fixed or portable device.

The above deck unit for the AIS according to the present invention includes a container for storing various circuits. An antenna, such as a messaging antenna, is mounted on the surface of the container, which is, e.g., a VHF antenna, used for transmitting/receiving messages. The circuits stored in the container include i) a radio circuit for transmitting/receiving the message using the messaging antenna, and ii) a controller for regulating transmitting/receiving operations carried out by the radio circuit. The controller serves, for example, to supply information to be included in the message broadcasted to or destined for other ships or the coast station to the radio circuit, and to supply information included in the message received by the radio circuit from other ships or the coast station to the interface means for the crew through the inboard transmission path. Herein, the nature of the inboard transmission path is largely different from that under the conventional developmental idea. The conventional art requires the radio circuit and the controller to be placed on the BDE side. As such, conventionally, an inboard transmission path is provided for connecting between the antenna and the radio circuit. In contrast, according to the present invention, the elements that are conventionally included in the BDE, such as the radio circuit and the controller, are provided on the ADE side. Therefore, the inboard transmission path of the present invention serves primarily as a transmission path between the controller and the interface for the crew.

By transferring this portion of the devices or circuits, which conventionally are included in the BDE, to the ADE, the present invention allows the number of channels of the inboard transmission path between the ADE and the BDE to be decided independently of the number of antennas. In other words, even if multiple antennas are provided associated with the ADE, it is sufficient to provide only one inboard transmission path, e.g., a cable, between the ADE and the BDE (a solution to the third problem). Moreover, even if the inboard transmission path is implemented by a wired cable, it is unlikely that an erroneous connection or the like of the cable will occur during installation, transfer, or the like of the shipborne facilities, because only one cable is needed for the inboard transmission path between the ADE and the BDE (a solution to the sixth problem). This would also facilitate the adaptation of a portable, efficient, and economical usage style (a solution to the fifth problem).

According to the present invention, the circuits placed on the ADE side are stored in a single container, and an antenna, such as a messaging antenna, is mounted on the surface of the container. In the above-described conventional arrangement, the inboard transmission path between the ADE and the BDE serves as the transmission path for connecting between the antenna and the radio circuit. In the present invention, such an antenna-to-radio circuit transmission path corresponds to the transmission path for connecting the surface and the interior of the container. Therefore, the transmission path between the antenna and the radio circuit is short and is enclosed, for the most part, in the container, which minimizes the chance of generating loss or degradation and entering noise. A signal transmitted between the ADE and the BDE of the present invention is a processed signal passed through the radio circuit or the controller, such as a digital signal or a video signal carrying data, rather than a signal of a generally high frequency and a faint power, such as a signal transmitted between the antenna and the radio circuit. This suppresses noise entry, loss, and degradation of the signal in the inboard transmission path between the ADE and the BDE to a level low enough to be ignored or easily compensated for (a solution to the first and second problems).

In the present invention, only the interface means for the crew, such as a display and an audio output device, need be provided for the BDE. It is unnecessary to provide multiple devices for the BDE, or connect between such devices. This realizes advantages, such as reducing the space occupied by the BDE (and the associated means for connecting between the BDE and the ADE or other devices of the BDE), facilitating installation on a relatively small ship (a solution to the seventh problem), and eliminating the connection lines among respective devices of the BDE (a solution to the eighth problem). Further, the size of the interface means itself for the crew does not increase (a solution to the ninth problem).

The container stores a measuring device for generating the dynamic information to be transmitted, such as a GPS receiver, a gyrocompass, or a GPS gyro, in addition to the radio circuit, e.g., the VHF radio circuit, and the controller. One type of such measuring device stored in the container is a radio determination device, such as the GPS receiver or the GPS gyro, which generates the dynamic information including the position of the ship based on a navigation signal received through the ether. Since the radio determination device is stored in the container, it is also preferable to mount a positioning antenna, which is used for receiving the navigation signal, on the surface of the container. Although the gyrocompass may be used for detecting the heading of the ship, it is sometimes necessary to detect and integrate the gyrating speed of the bow based on the output of the gyrocompass. With the GPS gyro, it is sufficient to couple positioning results of a plurality of GPS receivers. It should be noted that the GPS gyro is a sensor which detects a bearing or an inclination of an object, e.g., a ship, on which the GPS gyro is mounted, based on the signal from multiple GPS receivers which are fixedly positioned relative to each other.

When it is desired to adopt the configuration wherein the messaging antenna and the positioning antenna are mounted on the surface of the container and the radio circuit, the controller, the position detector, and so on are stored in the container, an antenna complex is preferably provided, by integrating the messaging antenna and the positioning antenna. One approach is to install an antenna complex that consists of a planar antenna and a whip antenna. The planar antenna, such as a patch antenna, may be provided on the outer surface of the container as the positioning antenna. Because the planar antenna used in the GPS, for example, is susceptible to weather, dust or sea conditions, it is usually protected by a radio-permeable, nonmetallic radome. A whip antenna may be used as a messaging antenna, and is comprised of a pole-like conductor having an approximately ¼ wavelength as a radiator. The whip antenna is arranged such that one end of the radiator extends externally through the radome and such that the radiator fits to the radome of the planar antenna. With this antenna structure, it is possible to provide multiple antenna functions by effectively using the container, especially the limited surface area of the container, to further minimize the ADE unit for the AIS.

One example of such an antenna complex suitable for implementing the present invention is disclosed in Japanese Patent Laid-Open Publication No. Hei 10-247815 by Koshio and Goto. In this publication, it is disclosed that the planar antenna is positioned relative to the whip antenna in such a manner that the planes of polarization of both antennas are arranged orthogonal to each other, in an attempt to avoid any interference. The cable connecting between the whip antenna and the radio circuit is also connected to the planar antenna so that the planar antenna and the whip antenna share a common grounded conductor. In this way, it is possible to substantially eliminate the influence of the presence of the planar antenna on the characteristic of the whip antenna, while relatively easily correcting and compensating for the influence of the presence of the whip antenna on the characteristic of the planar antenna (a solution to the fourth problem).

In some preferred embodiments of the present invention, the above-described antenna structure is used with a container of which at least part is formed by a conductor. The grounded conductor of the planar antenna is connected to the conductive part of the container to provide a grounded conductor for the whip antenna, thereby securing and enlarging the grounded surface of the whip antenna. In addition, at least one other portion of the container is formed by a thermal conductor placed in contact with or in proximity to the inner surface of the container in a manner that heat generated by a heating member (e.g., a radio circuit having an amplifier which generates heat during its operation) stored in the container is transmitted to the surrounding air via the container. This allows heat to be radiated and cooled by natural cooling in place of forced cooling, thereby simplifying the structure and realizing stable and highly reliable circuit operations.

In some preferable embodiments of the present invention, the whip antenna is connected to the radio circuit by a coaxial cable, where a coaxial connector is used for realizing a detachable connection. This arrangement increases the exchangeability of the whip antenna, which facilitates maintenance and replacement of the whip antenna and simplifies new installation and transfer procedures of the ADE unit for the AIS. The coaxial connector can be fixed primarily at a point of the planar antenna where a through hole is formed, and secondarily at a point of the radome where another through hole is formed. By attaching the coaxial connector at either point, the region where the through hole is formed in either the planar antenna or the radome (corresponding to the base part of the whip antenna herein) is mechanically forced by the coaxial connector, giving the unit an increased resistance to strong vibrations. When the coaxial connector is provided at the first point, an outer conductor of the coaxial connector may be connected to the grounded conductor of the planar antenna to secure and enlarge the grounded surface of the whip antenna.

At the second point, the coaxial connector is preferably fixed so as to seal the through hole of the radome in a watertight manner, realizing a simple watertight arrangement without packing rubber or a gasket. With the coaxial connector fixed to the second point, it is unlikely that the coaxial connector would cast a shadow on the planar antenna, compared to the coaxial connector at the first point, and it is very unlikely that the coaxial connector would obstruct the capturing or tracking of a satellite by the planar antenna. In addition, if the coaxial connector is provided at the first point, an inner diameter of the through hole to be formed in the planar antenna must be determined corresponding to an outer diameter of the coaxial connector, which forcedly increases the inner diameter of the through hole. With the coaxial connector provided at the second point, the inner diameter of the through hole can be made smaller, because it can be determined based on the outer diameter of the coaxial cable. A small inner diameter of the through hole may increase the design freedom of the planar antenna, which helps widen the frequency band available for the planar antenna.

Alternatively, in other preferable embodiments of the present invention, the whip antenna is connected to the radio circuit by the coaxial cable without using the coaxial connector, so as not to cast a shadow on the planar antenna. To realize this arrangement, the conductors of both the planar antenna and the whip antenna are arranged so that the grounded conductor of the planar antenna serves as the grounded conductor of the whip antenna, as described above. When connecting the coaxial cable extending from the radio circuit, the outer conductor of the coaxial cable from the radio circuit is connected to the grounded conductor of the planar antenna, and an inner conductor of the coaxial cable is connected to the radiator of the whip antenna. This not only abolishes the coaxial connector, but also secures the grounded surface of the whip antenna, suppresses the inner diameter of the hole in the planar antenna, and so on.

Examples of this type of arrangement include a first arrangement wherein the outer conductor of the coaxial cable is partly removed in advance for a predetermined length from a tip end of the coaxial cable, and the tip end of the inner conductor of the coaxial cable where the outer conductor is removed is connected to one end of the radiator of the whip antenna. Alternatively, in a second arrangement, the radiator of the whip antenna or any conductor connected therewith is extended toward the inside of the container via the through hole of the planar antenna, and the inner conductor of the coaxial cable is connected to the radiator of the whip antenna directly or indirectly. In these arrangements, the inner conductor of the coaxial cable partly serves as a radiator continuing from the radiator of the whip antenna. Optimally, the inner diameter of the through hole of the planar antenna can be reduced to the size of the outer diameter of the coaxial cable (when the coaxial cable penetrates through the hole) or to the size of the outer diameter of the inner conductor of the coaxial cable (when the part of the coaxial cable where the outer conductor is removed penetrates through the hole). This enlarges the scope of design freedom of the planar antenna.

In particular, the inner conductor of the coaxial cable is only present inside the container in the second arrangement when viewed from the planar antenna, so that replacement of the planar antenna is simplified. In the first arrangement, because the joint between the coaxial cable and the whip antenna exists external to the container when viewed from the planar antenna, the connection is made by a non-reversible connecting means, such as soldering. Alternatively, the inner conductor of the coaxial cable may be connected to the radiator of the whip antenna by a removable connector at the cost of casting a shadow on the planar antenna. In contrast, the connection of the second arrangement is made by placing a connector for directly or indirectly connecting between the coaxial cable and the whip antenna inside the container when viewed from the planar antenna. Therefore, soldering is not necessary, and a detachable connection can be realized without casting a shadow on the planar antenna. In the first arrangement, a part of the inner conductor is exposed near the tip end of the coaxial cable and used substantially as a part of the whip antenna. This part of the inner conductor is mechanically fragile and more likely to be cut off than other parts of the inner conductor. The second arrangement need not include such a fragile part, making unlikely any disconnection of the inner conductor leading to a disorder of the whip antenna.

In embodying the ADE unit for the AIS according to the present invention, it is possible to incorporate the wireless communication function of various long range aiding devices, such as the devices associated with the INMARSAT-C or ORBCOMM, into the container which is placed outdoors, in addition to the messaging function of, e.g., VHF and the positioning function of the GPS, gyros, the GPS gyro, or the like. Specifically, a long range antenna used for wireless communication of long range aiding signals is mounted on the surface of the container which stores the radio circuit, the controller, and so on, while the long range aiding device for communicating the long range aiding signals using the long range antenna is installed inside the container. It should be noted that installed in the container is a portion of the long range aiding device mainly related to the wireless communication, and that another portion of the device mainly related to the interface for the crew is formed by the above-described interface means for the crew or provided as a separate interface means associated therewith. The controller allows the long range aiding device to transmit some portions of the information supplied from the interface means for the crew via the inboard transmission path as the long range aiding signal, while supplying the long range aiding signal received by the long range aiding device to the interface for the crew via the inboard transmission path.

As described above in connection with FIG. 14, when the AIS transponder is newly installed on a certain ship, and it is desired to connect the AIS transponder with an existing or any simultaneously introduced long range aiding device, a device for interfacing between the devices must also be introduced. In contrast, if at least a portion of the long range aiding device mainly related to the signal communications is already incorporated in the container of the outdoor facilities as described above, it is only necessary to connect the circuits and elements in the container to the interface means for the crew, such as a general-purpose personal computer. In other words, there is no need to introduce the interface device between the transponder and the long range device, and the wiring can be simplified (a solution to the eleventh problem). When the AIS transponder is newly introduced to a ship having no long range aiding device, it is also possible to introduce the long range aiding function at a low cost by introducing the system utilizing the ADE unit according to one embodiment of the present invention.

To improve the portableness of the ADE unit for the AIS, it may be preferable to provide a connector for removably connecting the elements stored in the container with the inboard transmission path. The connector, or any connector separately provided for the power supply, may also be used for feeding power to the elements stored in the container from an external power supply. The portableness may further be improved by providing a cell or any generator means which generates power by discharging or generating operations inside, or on the surface of, the container.

The ADE unit for the AIS according to the present invention, together with the above-mentioned interface means for the crew and the wired or wireless inboard transmission path, forms a part of the shipborne facilities for the AIS. The shipborne facilities for the AIS correspond to the part of the AIS, especially the onboard part of the AIS, which is the system for assisting the voyage of ships by communicating messages concerning the names, locations, etc., of other ships received from them or a coast station and supplying it to each ship. Therefore, it is assumed that the present invention is used primarily on ships, but the present invention is not limited to this application. For example, the present invention can be implemented as a waterborne complementary unit for the AIS, such as a unit mounted on a buoy, which is mounted on a waterborne structure placed fixedly in a certain water area or a waterborne floating structure. The waterborne complementary unit for the AIS is provided with a messaging antenna on the surface of the container for wireless communications of the message. The container stores the radio circuit for automatically receiving and transmitting messages from and to ships or a coast station using the messaging antenna, and the controller for controlling the receiving/transmitting operations of the radio circuit and supplying the information to be communicated to the ships or the coast station to the radio circuit. Thus, the waterborne complementary unit for the AIS can transmit the static or dynamic information, such as the current position of the unit, concerning the waterborne structure or the waterborne floating structure on which the unit is mounted. Because the unit has a compact structure wherein one or more circuits and antennas are incorporated in a single container, the unit can more easily be mounted on, e.g., a buoy, than those arrangements shown in FIGS. 13 and 14 (a solution to the tenth problem).

DESCRIPTION OF THE PREFERRED EMBODIMENTS

The present invention will be described below in terms of preferred embodiments thereof by reference to the accompanying drawings.

(1) First Embodiment

Figure 1:
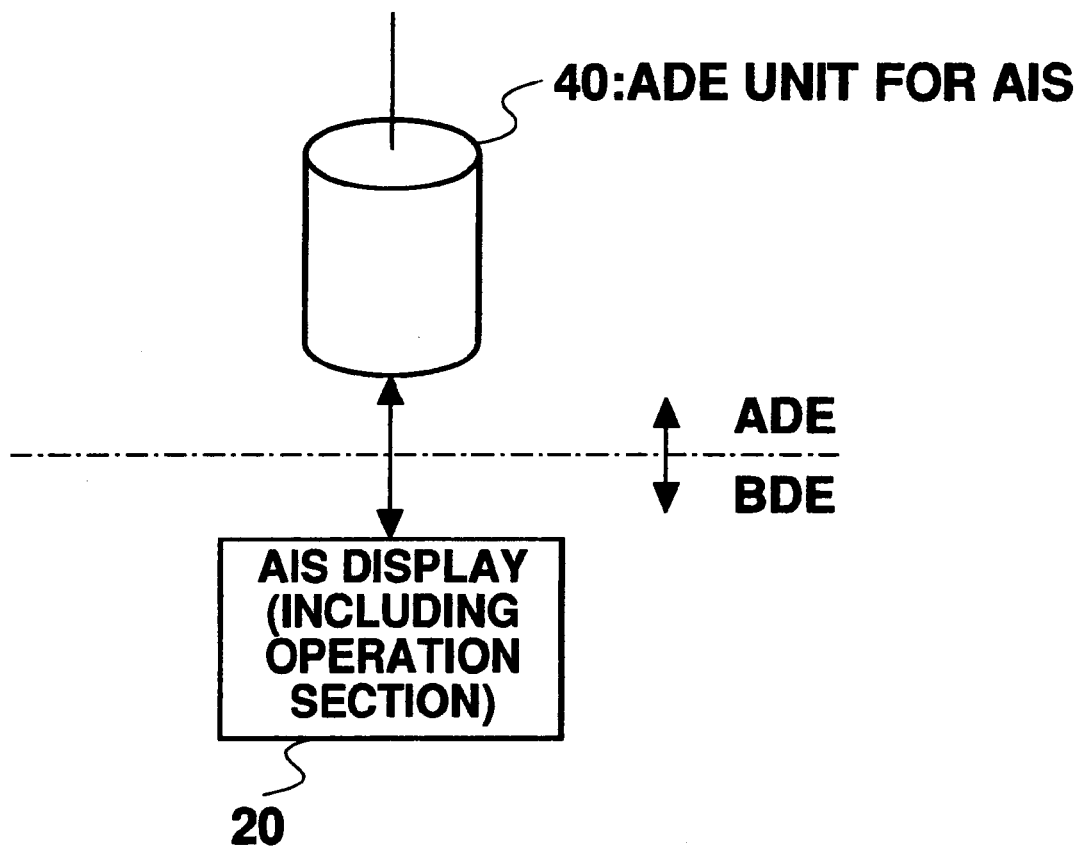
FIG. 1 is a block diagram illustrating an arrangement of the shipborne facilities for the AIS, especially the classification of and the connection between respective devices of the BDE and the ADE, according to a first embodiment of the present invention.
Figure 2:
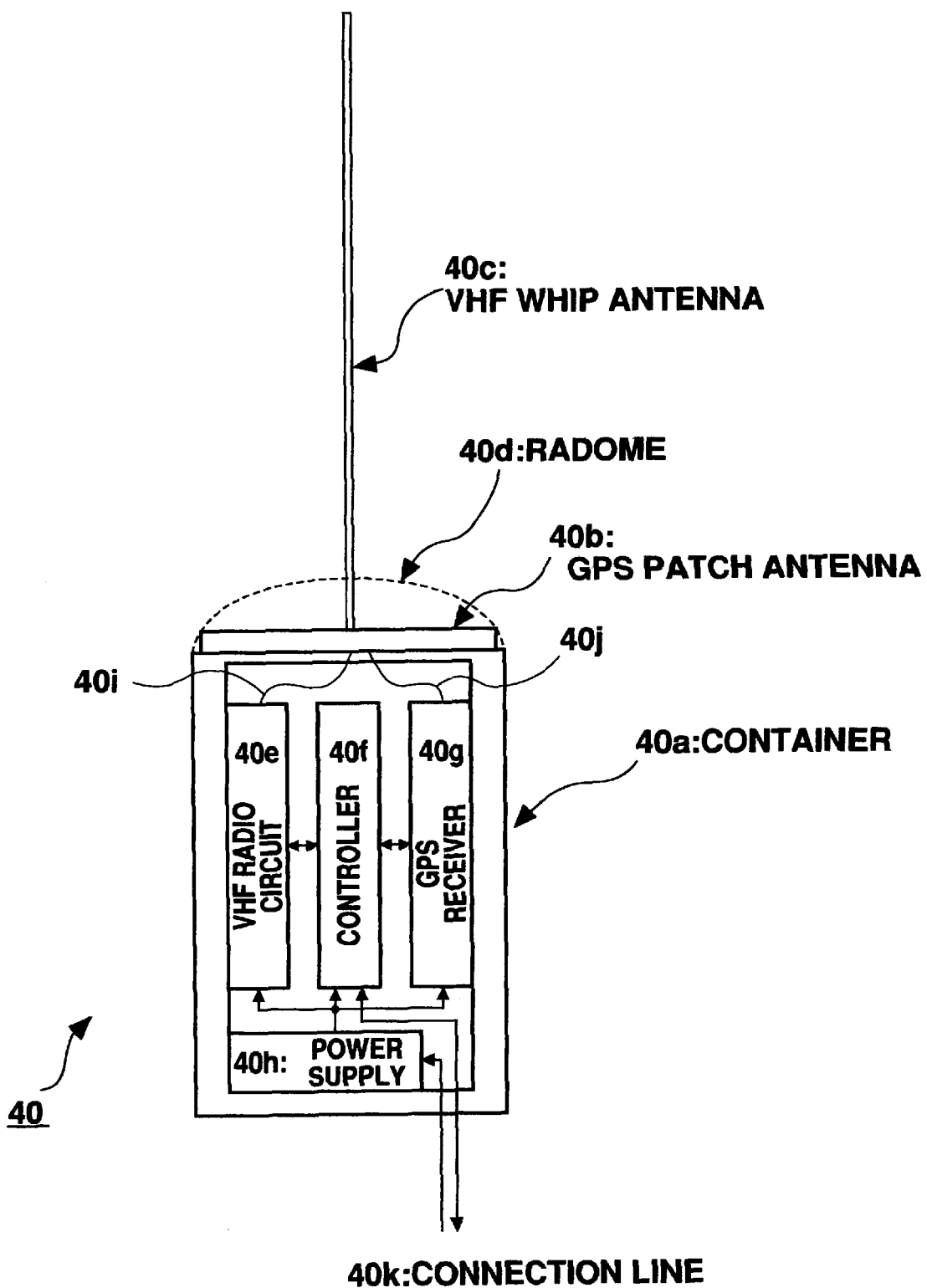
FIG. 2 is a schematic sectional view illustrating an arrangement of an ADE unit for the AIS, especially an arrangement of respective elements in a container and a location where an antenna is placed on the surface of the container, according to the first embodiment of the present invention.
Figure 3:
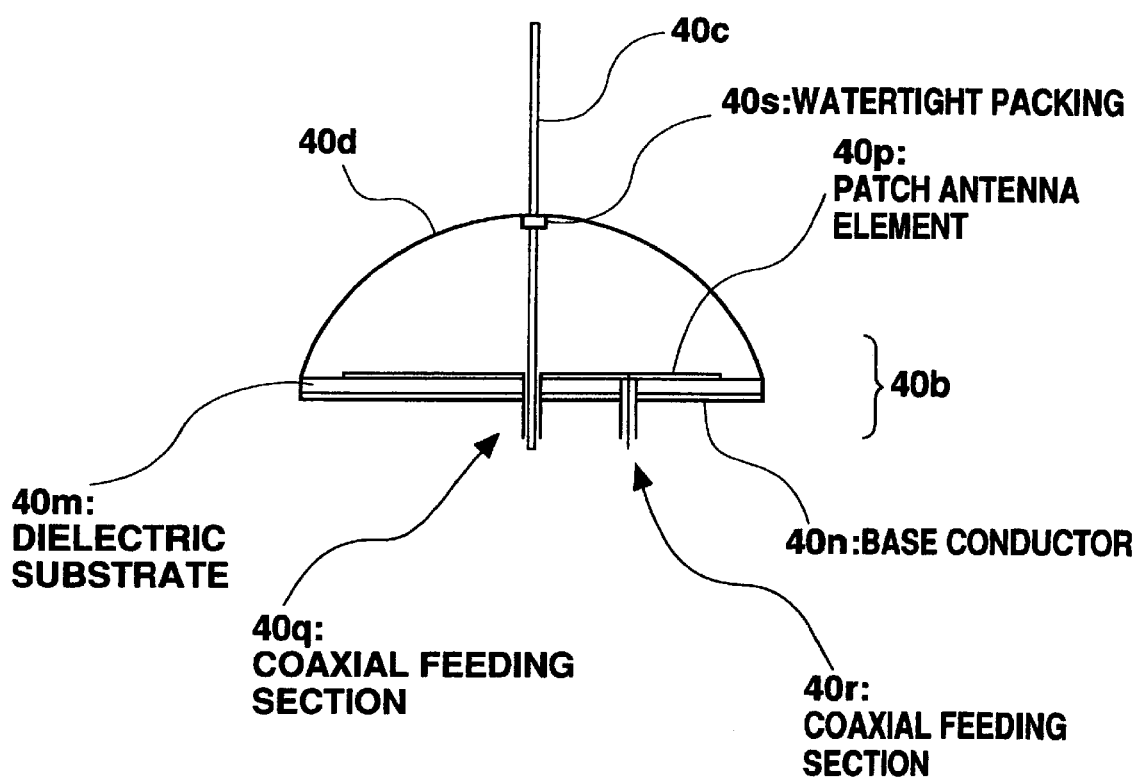
FIG. 3 is a schematic sectional view illustrating an antenna structure according to the first embodiment of the resent invention.

FIGS. 1–3 illustrate an arrangement of the shipborne facilities for the AIS according to a first embodiment of the present invention. The facilities according to the present invention include an ADE unit for the AIS 40 and an AIS display 20, which are connected by a wired or wireless inboard transmission path.

As described above, the shipborne facilities for the AIS call for an interface means for the crew in order to provide information to the crew of the ship on which the facilities are mounted, by visually displaying the information or providing an audio output, and to enable setting of static information concerning the ship. The AIS display 20 is one type of such interface means and includes a display device, such as a CRT or an LCD, and various operators, such as buttons, switches, a dial, a touch panel, a keyboard, a pointing device, etc., which are not shown.

As will be described below, various functions served by the BDE side in the arrangements shown in FIGS. 13–15, such as wireless communications, positioning and measurement, and signal processing functions, are covered by the ADE unit for the AIS 40 which herein belongs to the ADE side. Therefore, a relatively inexpensive and small universal type device may be used as the AIS display 20. For example, the AIS display 20 can be realized by various general-purpose personal computers (PC) including desktop, notebook, and palm top computers, or personal digital assistants (PDA). The AIS display 20 can be placed fixedly at the residential area or workplaces of the crew, or it can be transported or carried by the crew. There is no need to provide multiple devices as the BDE, or connect between such devices. This reduces a space occupied by the BDE necessary for placing the shipborne facilities for the AIS, which further facilitates the introduction of the facilities to relatively small ships. This also prevents a disorder caused by erroneous wiring, because wiring for connecting respective devices of the BDE is abolished,.

An inboard transmission path (indicated by a connection line 40k in FIG. 2) for connecting the AIS display 20 with the ADE unit for the AIS 40 transmits information, such as part of the static information concerning the ship entered by the crew by operating the AIS display 20, or already stored and set in the AIS display 20, to the ADE unit for the AIS 40 from the side of the AIS display 20. The inboard transmission path also transmits necessary information or signals required to enable, e.g., screen display of the AIS display 20 from the ADE unit for the AIS 40 to the AIS display 20. To realize the AIS display 20 by the general-purpose PC or the like, the inboard, wired or wireless transmission path between the ADE unit for the AIS 40 and the AIS display 20 preferably conforms to a particular standard and specification compatible with the PC. If provision of a wired path is desired, either a fixed or an unfixed cable can be used, according to type and size of the ship on which the cable is laid (e.g., availability of space for laying cable), type of the AIS display 20 (e.g., fixed or portable), and intended use of the shipborne facilities (e.g., possibility and frequency of transfer of the facilities).

Figure 13:
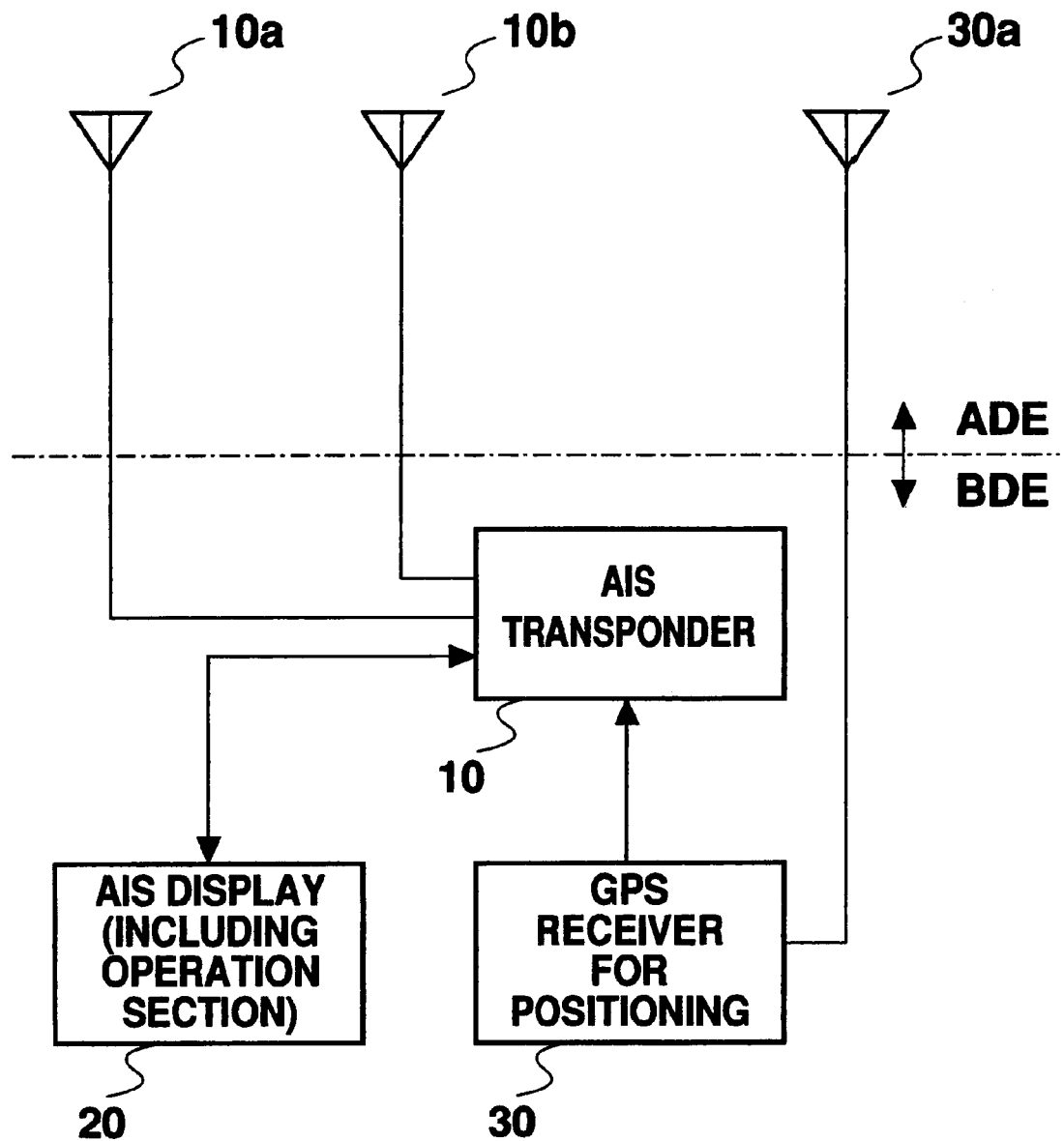
FIG. 13 is a block diagram illustrating a conventional arrangement of the shipborne facilities for the AIS, especially the classification of and the connection between respective devices of the ADE and the BDE.
Figure 14:
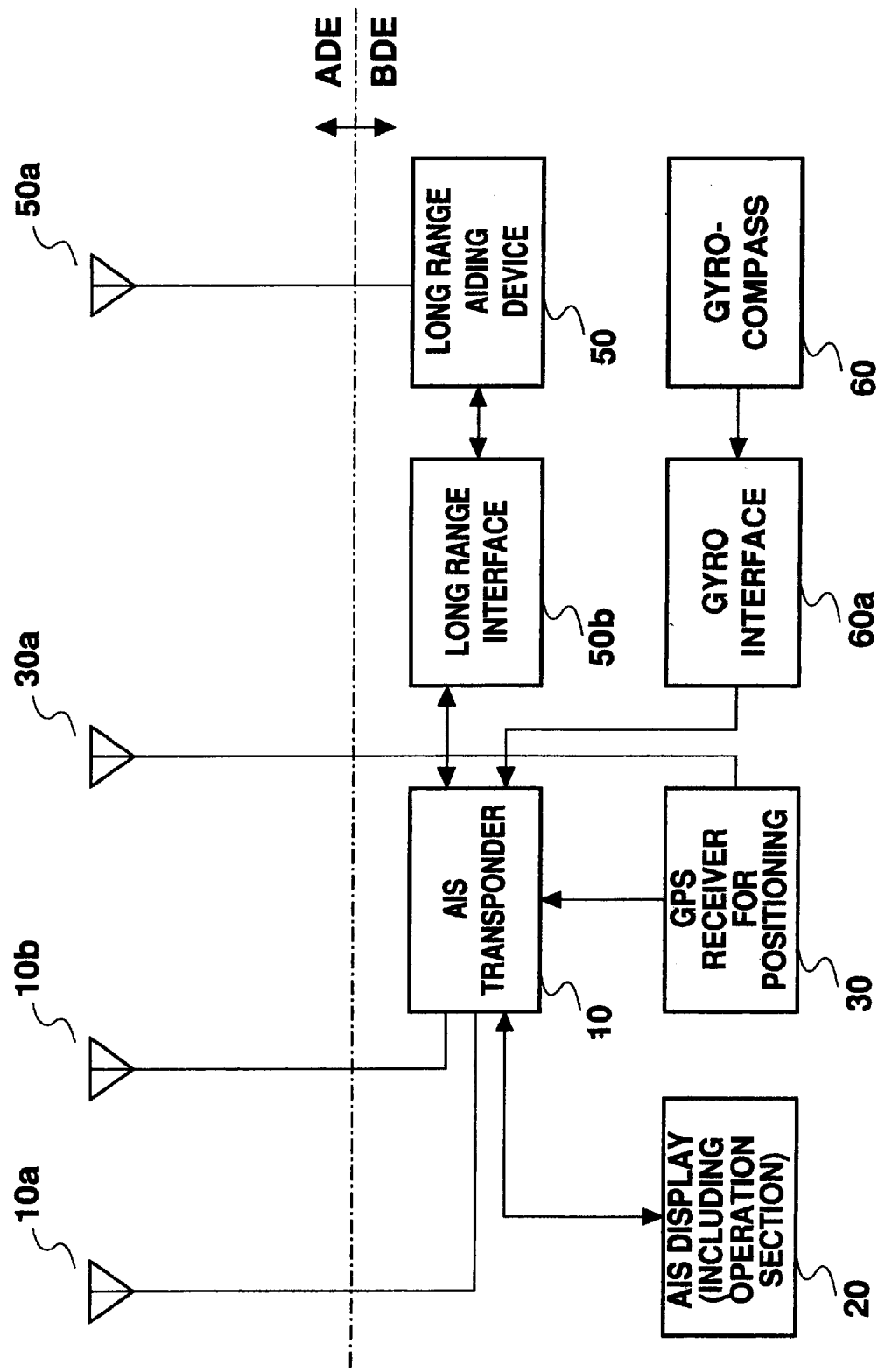
FIG. 14 is a block diagram illustrating another conventional arrangement of the shipborne facilities, especially the classification of and the connection between respective devices of the ADE and the BDE.
Figure 15:
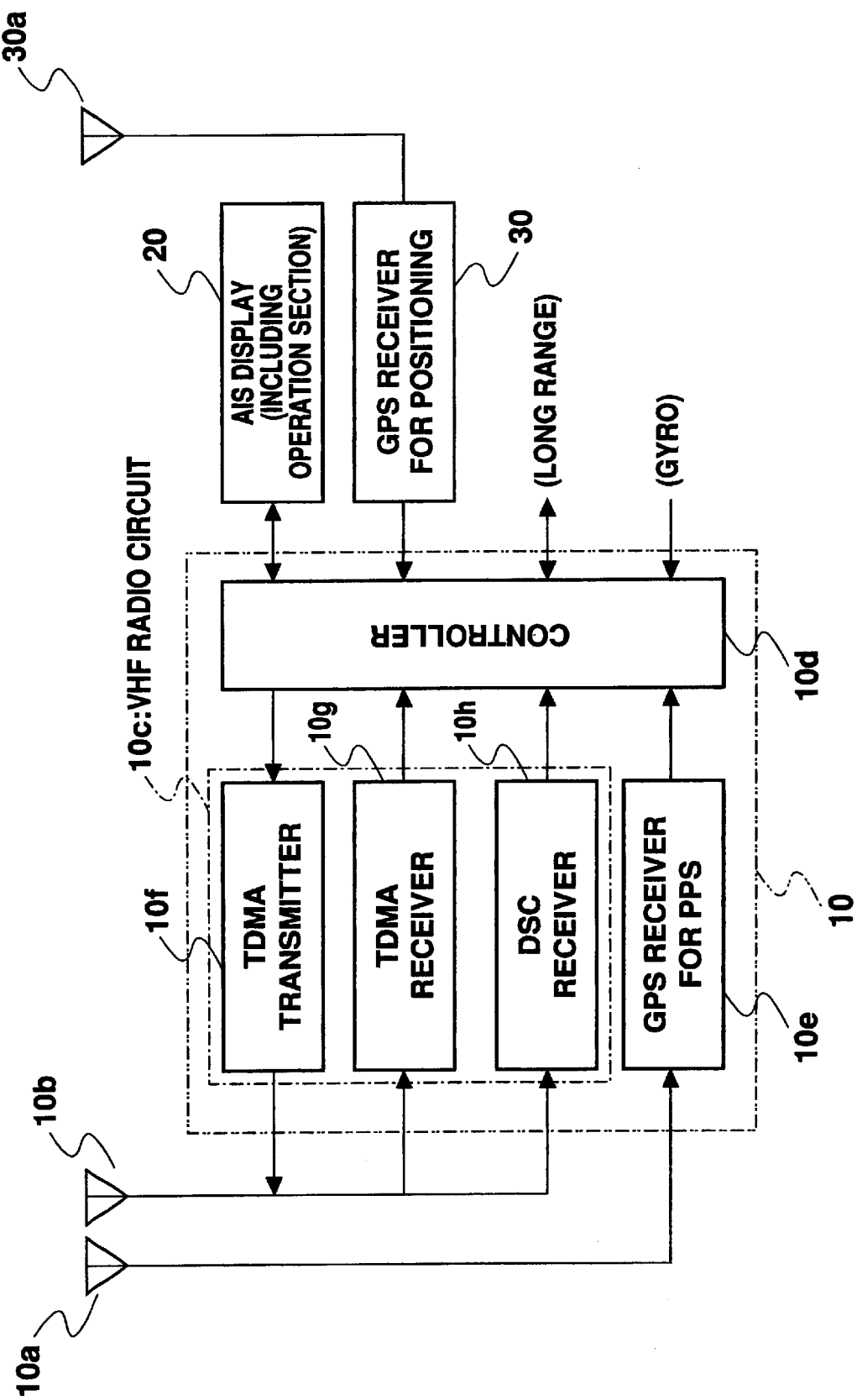
FIG. 15 is a block diagram illustrating an internal structure of a conventional AIS transponder.

Unlike the inboard transmission path between the ADE and the BDE of the facilities shown in FIGS. 13–15, there is no need to use a plurality of (or a bundle of) antenna cables as the inboard transmission path for transmitting signals having a radio frequency between the ADE unit for the AIS 40 and the AIS display 20. For example, a cable for transmitting a base band signal serially or in parallel, or wireless communication by a so-called extremely low power radio may be used. Wired transmission of the radio frequency signals can be eliminated because a radio circuit 40e and a controller 40f are provided on the ADE side, which will be described later, so that the inboard transmission path between the ADE and the BDE serves to connect between the controller and the interface means, rather than between antennas and the radio circuit. For the same reason, only one inboard transmission path need be provided between the ADE and the BDE, regardless of the number of antennas. Therefore, even if a fixed cable is used for the inboard transmission path, it is possible to suppress the cost and effort of laying cables, while decreasing the chance of, e.g., erroneous connection of the cable during installation or transfer of the shipborne facilities.

With such a simplified inboard transmission path between the ADE and the BDE, as well as the simplification of the BDE (i.e., reducing the number of devices in the BDE and eliminating connections among such devices in the BDE) as described above, portability of the shipborne facilities is further increased. Specifically, with the configuration according to the present embodiment, efficient and economical usage of facilities should by a plurality of ships is simplified. For example, the shipborne facilities, especially the ADE unit for the AIS, may be carried by someone or transferred from a ship that is not scheduled to sail to another ship. If the facilities of the present embodiment are introduced to a ship where the cable or the like is already laid for connecting between the GPS receiver and the GPS antenna, the existing cable can be used to provide an inboard transmission path between the ADE unit for the AIS 40 and the AIS display 20, such that no cost or labor are necessary for laying cables.

In addition to the reduced number of channels, loss and noise are reduced, because the transmission path between the ADE and the BDE can transmit a relatively low frequency signal that is little affected by noise. Specifically, the signal carried along the transmission path can be a processed signal passed through the VHF radio circuit 40e or the controller 40f, rather than an unprocessed, faint radio frequency signal obtained as an antenna output. Thus, the risk of occurrence of loss or degradation or entry of noise in the inboard transmission path between the ADE unit for the AIS 40 and the AIS display 20 can be suppressed to a level low enough to be ignored or easily compensated for.

The shipborne facilities for the AIS also call for the function of receiving messages of static and dynamic information concerning other ships from those ships or a coast station, and the function of transmitting messages of the static and dynamic information concerning the ship on which the facilities are installed. Among items of information to be sent to other ships or the like, the dynamic information concerning the ship must be detected or entered by some means. The ADE unit for the AIS 40 of the present invention is characterized by a single container 40a in which various circuits and devices related to the aforementioned functions, i.e. the wireless communications and the control of the message and measuring and positioning for acquiring the dynamic information concerning the ship. Secondarily, the unit is characterized as being placed above on the ship so as to transmit and receive the radio signals to and from other ships and to receive the signal from the navigation satellite. Thirdly, by adopting the antenna complex with the container integrated therewith, the unit can suppress an inter-antenna interference, noise, and the like, and has a favorable heat radiating characteristic (which will be described in detail later). It should be noted that, although no onboard structure for placing the unit outdoors is shown herein, various structures can be adopted, such as supporting the unit by a dedicated pole or a pedestal, fixing the unit by adding supporting members to the existing structure, tying the unit to or suspending it from the existing structure, such as a handrail, and so on. The structure to be adopted may be determined according to the size of the ship, frequency of the transfer, etc.

As shown in FIG. 2, the ADE unit for the AIS 40 incorporates most of the devices shown in FIG. 15 in or on the surface of the single container 40a.

Among the devices configured in the container 40a, the VHF radio circuit 40e corresponds to the VHF radio circuit 10c, the controller 40f corresponds to the controller 10d, and a GPS receiver 40g corresponds to the GPS receiver for PPS 10e and the GPS receiver for positioning 30 of FIG. 15. The GPS receiver 40g not only generates a PPS signal, but also measures the current position, the sailing speed, and so on of the ship. The controller 40f supplies to the VHF radio circuit 40e a positioning result (e.g., the ship is position) from the GPS receiver 40g and a signal containing the information supplied from the side of the AIS display 20 via the connection line 40k. The controller 40f then causes the VHF radio circuit 40e to perform wireless communications in synchronism with the PPS signal from the GPS receiver 40g to handle the received information, and to supply the processed information to the AIS display 20 via the connection line 40k.

FIG. 15 does not show any device corresponding to a power supply 40h. In the present embodiment, the power supply 40h feeds power to the devices in and on the surface of the container 40a. For example, the power supply 40h transforms, rectifies, and regulates the power provided externally via the connection line 40k. Alternatively, the power supply 40h may be a primary or secondary cell, or a solar cell or the like may be placed on the surface of the container 40a to form the power supply 40h, or one unit thereof.

On the surface of the container 40a, a VHF whip antenna 40c used for communicating messages for the VHF radio circuit 40e, and a GPS patch antenna 40b used for receiving the navigation signal (or a navigation message) by the GPS receiver 40g are provided, as well as a connector (not shown) for connecting the connection line 40k to the controller 40f and the power supply 40h. The VHF radio circuit 40e receives and transmits messages using the VHF whip antenna 40c. The GPS receiver 40g generates the dynamic information including the position of the ship, based on the navigation signal received using the GPS patch antenna 40b. The VHF whip antenna 40c is connected to the VHF radio circuit 40e via a connection line 40i, and the GPS patch antenna 40b is connected to the GPS receiver 40g via a connection line 40j, respectively. The connection lines 40i and 40j are preferably flexible or rigid coaxial cables. In particular, it should be noted that the length of the connection lines 40i and 40j, respectively, is significantly shorter than the antenna connection line shown in FIGS. 13–15, and that these lines are shielded from the container 40a (when the container 40a is made of a conductor).

The VHF whip antenna 40c and the GPS patch antenna 40b are implemented by an antenna complex, such as, shown in FIG. 3.

The GPS patch antenna 40b has a circular or rectangular dielectric substrate 40m (a circular substrate is shown in the figures). A base conductor 40n serving as a grounded conductor is provided on one side of the dielectric substrate 40m, while a circular patch antenna element 40p serving as a radiator is arranged on the other side of the substrate. Although various parts and circuits associated with the patch antenna element 40p are not shown in the illustrated example, those with skill in the art can easily determine the arrangement of such parts and circuits by reference to the disclosure of the present invention. The patch antenna element 40*p* is fed from the GPS receiver 40*g* via the connection line 40*j* through a coaxial feeding section 40*r* from the side of the base conductor 40*n*, at a predetermined distance apart from the center of the patch antenna element 40*p*. In addition, a through hole is formed in the center of the GPS patch antenna 40*b*, and the inner side of the through hole is covered by a conductor which electrically conducts with the base conductor 40*n* and the element 40*p*, whereby a short pin of the patch antenna element 40*p* is formed.

The radiator or a pole shaped conductor of the VHF whip antenna 40*c* extends through a radome 40*d* and the center of the element of the GPS patch antenna 40*b*, wherein the radome 40*d* is a cover capable of transmitting radio waves to protect the GPS patch antenna 40*b* from weather, dust, and sea conditions. Thus, the radiator extends from below the patch antenna 40*b* to above the radome 40*d* in FIG. 3. Again, although various parts and circuits associated with the VHF whip antenna 40*c* are not shown in the figure, those skilled in the art can easily determine the arrangement of such parts and circuits by reference to the present application. The through hole formed in the radome 40*d* is sealed in a watertight manner by a watertight packing 40*s* formed by rubber or the like to prevent invasion by rain, the sea, and so on.

As described above, the through hole formed in the center of the GPS patch antenna 40*b* is covered by the conductor and extends further below to the inside of the container 40*a*. Although not shown, a certain supporting structure is adopted for keeping a predetermined distance between the radiator of the VHF whip antenna 40*c* and the conductor covering the inside of the through hole of the GPS patch antenna 40*b*. This provides a coaxial structure at and immediately below the through hole formed in the center of the element of the GPS patch antenna 40*b*, wherein the radiator of the VHF whip antenna 40*c* serves as an inner conductor and the conductor electrically conducting with the base conductor 40*n* serves as an outer conductor. The length of the radiator of the VHF whip antenna 40*c* is set so that the above-mentioned coaxial structure, i.e., the part above a coaxial feeding section 40*q*, is approximately equal to ¼ of the wavelength used for communication. The coaxial feeding section 40*q* is connected to the connection line 40*i*, which is not shown. In this embodiment, because the outer conductor or the base conductor of the coaxial feeding section 40*q* electrically conducts with the base conductor 40*n*, it is secured that the ground surface of the VHF whip antenna 40*c* spreads across the entire base conductor 40*n*. The ground surface of the VHF whip antenna 40*c* can further be increased by making at least part of the container 40*a* to be conductive, and fixing the GPS patch antenna 40*b* to the container 40*a* so that the base conductor 40*n* electrically conducts with the conductive part of the container 40*a*.

In the above-described antenna complex, the plane of polarization of the VHF whip antenna 40*c* and that of the GPS patch antenna 40*c* are approximately orthogonal to each other, which prevents interference between the antennas. Because the base conductor 40*n* of the GPS patch antenna 40*b* serves as the grounded conductor of the VHF whip antenna 40*c*, it is possible to substantially eliminate the influence of the GPS patch antenna 40*b* on the characteristic of the VHF whip antenna 40*c*, while correcting and compensating for the influence of the VHF whip antenna 40*c* on the characteristic of the GPS patch antenna 40*b* relatively easily. Concerning those points, reference is made to Japanese Patent Laid-Open Publication No. Hei 10-247815.

The configuration of this embodiment advantageously reduces the size of the ADE unit for the AIS 40 the surface area of the container 40*a* by adopting the above-described antenna complex, although multiple antennas are provided. If the container 40*a* is made of a metal, for example, it is possible to enlarge the ground surface of the VHF whip antenna 40*c* as described above and also to make use of such an enlarged surface area to promote heat discharge and cooling of elements within the container 40*a*. Specifically, as metals conduct heat and the ADE unit for AIS 40 is installed above decks, the heat generated inside the ADE unit can be discharged by natural cooling of the surface of the container 40*a*. In this embodiment, heat generating devices stored in the container 40*a*, such as the VHF radio circuit 40*e* having an amplifier and the power supply 40*h* having a switching component, are arranged in contact with or in close proximity to the inner surface of the container 40*a* (see the arrangement of respective elements shown in FIG. 2), to thereby enable natural heat discharge to the atmosphere. In this way, the heat discharging and cooling operation is conducted using natural air, instead of forced air, thereby simplifying the arrangement of the device and realizing more stable and reliable circuit operations.

Also, the transmission path between the VHF whip antenna 40*c* and the VHF radio circuit 40*e* of this embodiment is much shorter than the inboard transmission path between the ADE and the BDE in the examples shown in FIGS. 13–15. The transmission path of this embodiment is also stored in the container 40*a* made of a metal or the like. This further reduces the risk of loss or degradation and minimizes the entry of external noise into the container 40*a*.

(2) Second and Third Embodiments

Figure 4:
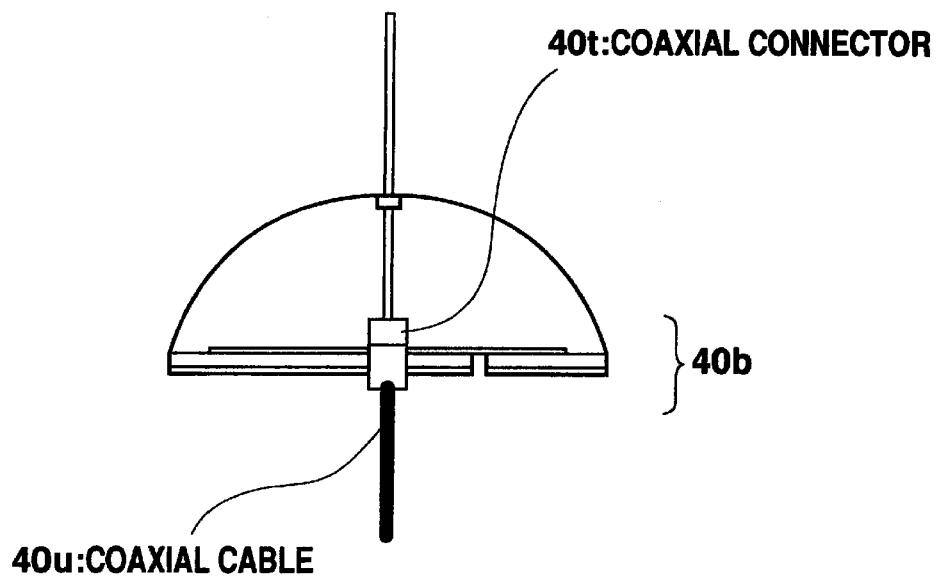
FIG. 4 is a schematic sectional view illustrating an antenna structure according to a second embodiment of the present invention.
Figure 5:
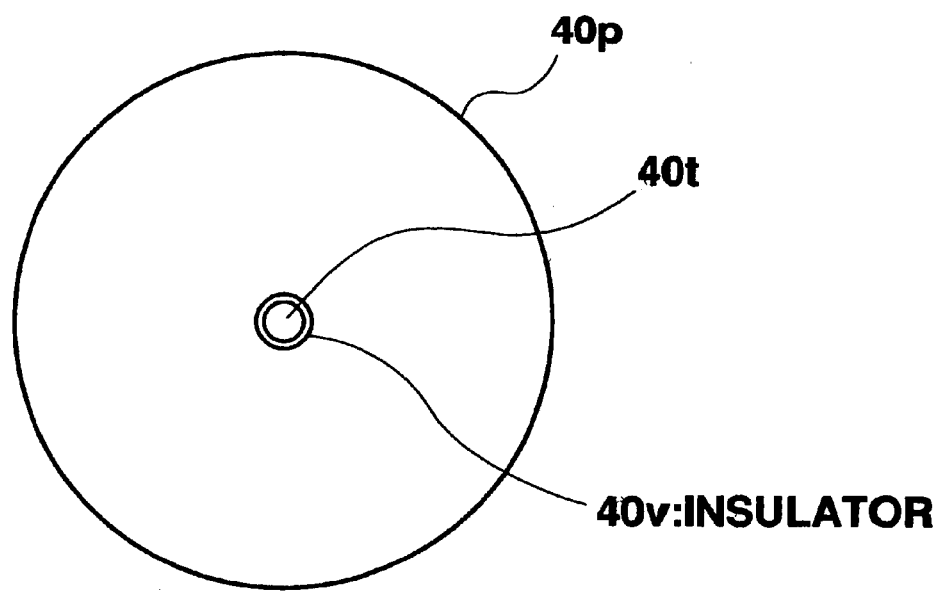
FIG. 5 is a top view of a planar antenna according to the second embodiment of the present invention.
Figure 6:
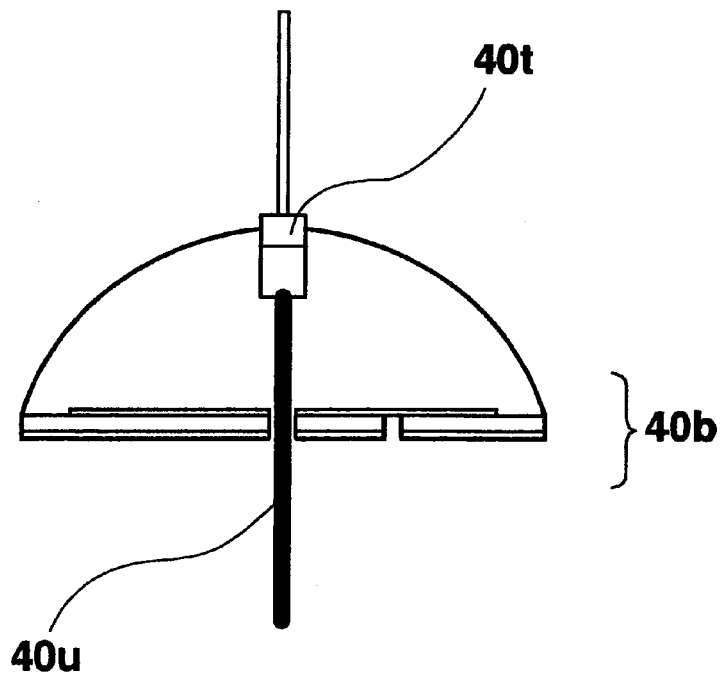
FIG. 6 is a schematic sectional view illustrating an antenna structure according to a third embodiment of the present invention.
Figure 7:
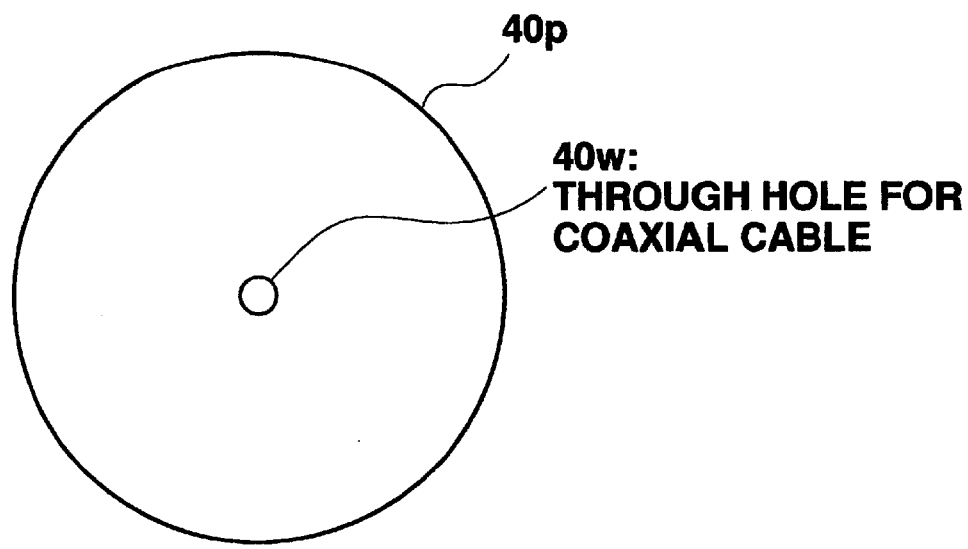
FIG. 7 is a top view of a planar antenna according to the third embodiment of the present invention.
Figure 8:
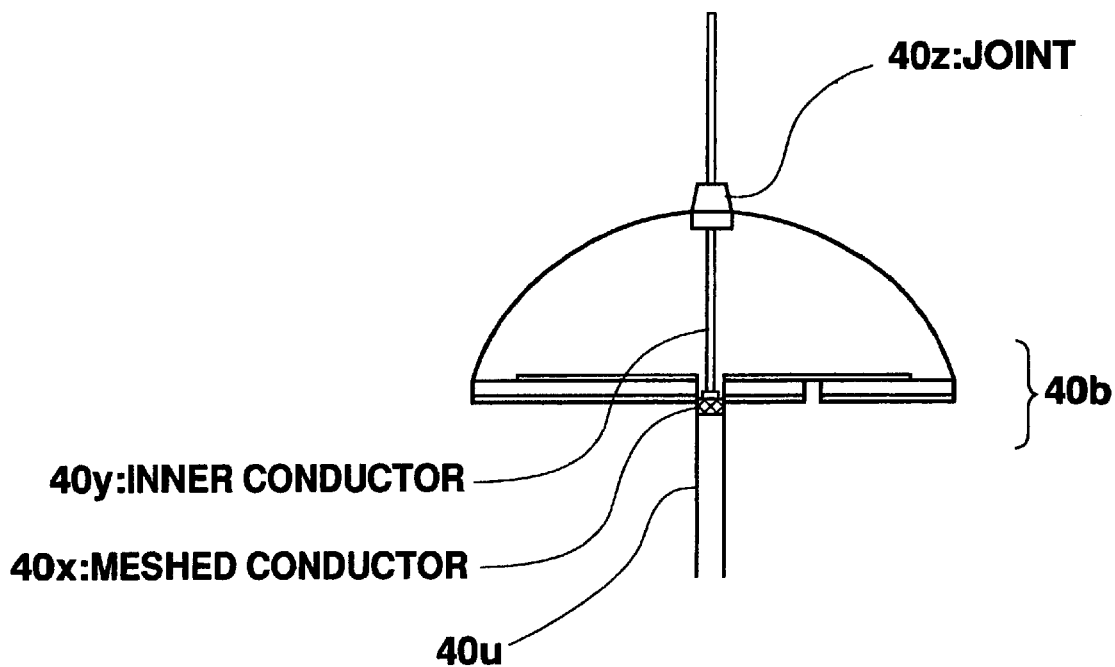
FIG. 8 is a schematic sectional view illustrating an antenna structure according to a fourth embodiment of the present invention.
Figure 9:
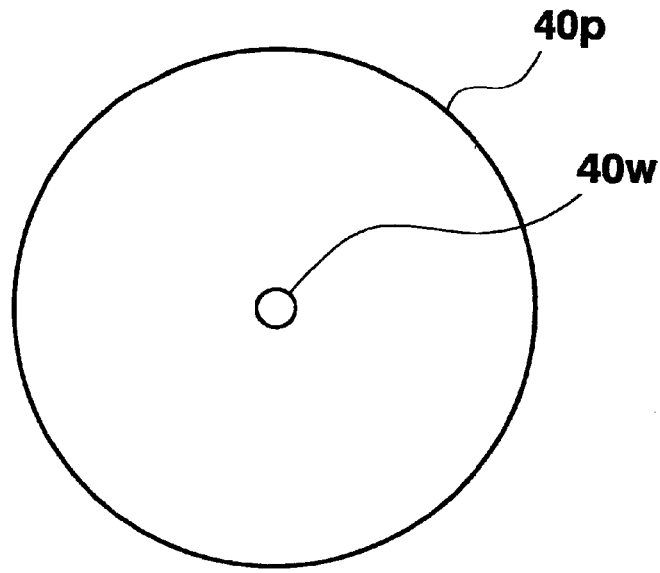
FIG. 9 is a top view of a planar antenna according to the fourth embodiment of the present invention.
Figure 10:
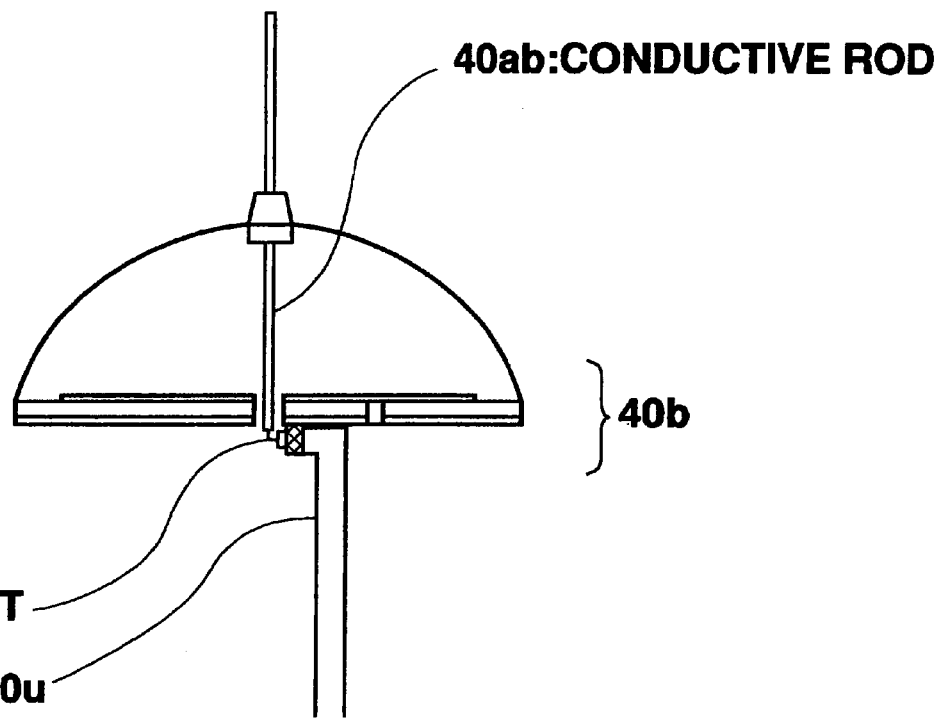
FIG. 10 is a schematic sectional view illustrating an antenna structure according to a fifth embodiment of the present invention.

FIGS. 4 and 5 illustrate a second embodiment and FIGS. 6 and 7 illustrate a third embodiment of the antenna complex according to the present invention. Here, elements similar or identical to those in the first embodiment will not be described again, and reference numerals for such components are not shown in the figures. The coaxial feeding section 40*r* is also not shown in these figures.

In both the second and third embodiments, the connection line 40*i* is formed by a coaxial cable 40*u*, which is connected to the VHF whip antenna 40*c* using a coaxial connector 40*t*. Thus, the coaxial cable 40*u* and the VHF whip antenna 40*c* are removably connected with each other, allowing the VHF whip antenna 40*c* to be temporarily removed during, for example, replacement or transfer of the antenna, simply by removing the coaxial connector 40*t*. Therefore, the antenna structures according to the second and third embodiments of the present invention simplify maintenance and enhance portability compared to the structure of the first embodiment. In addition, by attaching the coaxial connector 40*t* to the through hole of the GPS patch antenna 40*b* (the second embodiment) or of the radome 40*d* (the third embodiment), the base part of the radiator of the VHF whip antenna 40*c* is mechanically forced, which provides anti-vibration characteristics superior to those obtained with the configuration according to the first embodiment. Although in the first embodiment a supporting means for maintaining the distance between the inner and outer conductors at the coaxial feeding section 40*q* is required, such a means is not necessary in the second and third embodiments because of the use of the coaxial cable 40*u*.

The configurations of the second and third embodiments have respective advantages and disadvantages. In the second embodiment, the coaxial connector 40*t* is attached to the through hole of the GPS patch antenna 40*b*, so that the coaxial connector 40*t* is likely to cast a shadow on the patch antenna element 40*p*. Namely, the coaxial connector 40*t* blocks the signal from the positioning satellite, which may prohibit the GPS patch antenna 40b from receiving or acquiring the signal. In the third embodiment, the coaxial connector 40t is placed away from the patch antenna element 40p, which lessens the risk of casting a shadow of the coaxial connector 40t on the patch antenna element 40p compared to the second embodiment.

The second embodiment calls for the watertight packing 40s as in the first embodiment. In contrast, the coaxial connector 40t serves to seal the through hole of the radome 40d in a watertight manner in the third embodiment, which advantage only reduces the number of necessary components by abolishing the watertight packing 40s eliminates the need for replacing the packing when the rubber deteriorates due to aging.

However, while the second embodiment can secure and enlarge the ground surface of the VHF whip antenna 40c by rendering the outer conductor of the coaxial cable 40u, and accordingly of the coaxial connector 40t, to electrically conduct with the base conductor 40n, such conduction and connection is difficult in the third embodiment.

In the second embodiment, it is necessary to match an inner diameter of the through hole of the GPS patch antenna 40b with an outer diameter of the coaxial connector 40t, because of the need for attaching the coaxial connector 40t. The third embodiment uses only a small through hole 40w in the GPS patch antenna 40b, as compared to the second embodiment, because fine coaxial cable 40u is inserted through the through hole of the GPS patch antenna 40b. Because through hole 40w is small, the GPS patch antenna 40b realizes a wider frequency band which improves the degree of design freedom.

In the second embodiment, to prevent the conductor on the inner surface of the through hole from electrically conducting with the conductor exposed on the surface of the coaxial connector 40t, an insulator 40v must be provided on the through hole conductor of the GPS patch antenna 40b. The third embodiment does not require such the insulator 40v, because the coaxial cable 40u has an insulative coating.

(3) Fourth and Fifth Embodiments

Fourth and fifth embodiments of the present invention are illustrated in FIGS. 8 and 9 and FIGS. 10 and 11, respectively. Here, similar or identical elements to those of the first through third embodiments are not described again and their reference numerals are not shown in the figures. Also, the coaxial power supply 40r is not shown in these figures.

In the fourth and fifth embodiments, the coaxial cable 40u is used as the connection line 40i, as in the second and third embodiments. Because the coaxial connector 40t tends to cast a shadow on the patch antenna 40p, it is eliminated in order not to prevent the signal acquisition and receiving of the GPS patch antenna 40b. Instead, the fourth and fifth embodiments uses a conductive joint 40z which also has a watertight sealing function and is formed at the through hole of the radome 40d as one element used to connect the radiator of the VHF whip antenna 40c with the inner conductor of the coaxial cable 40u.

In the fourth embodiment, to connect the radiator of the VHF whip antenna 40c with the inner conductor of the coaxial cable 40u, a meshed conductor 40x (and a dielectric material) serving as the outer conductor is removed for a predetermined length from the tip end of the coaxial cable 40u, and an inner conductor 40y is extended to the joint 40z via the through hole of the GPS patch antenna 40b and connected with the joint 40z by soldering. In the fifth embodiment, a conductive rod 40ab integrated (or connected at the joint 40z) with the radiator of the VHF whip antenna 40c is extended inwardly to the container 40a via the through hole of the GPS patch antenna 40b. The conductive rod 40ab is then connected to the core wire 40y at a position below the base conductor of the GPS patch antenna 40b as shown in the figure.

Figure 11:
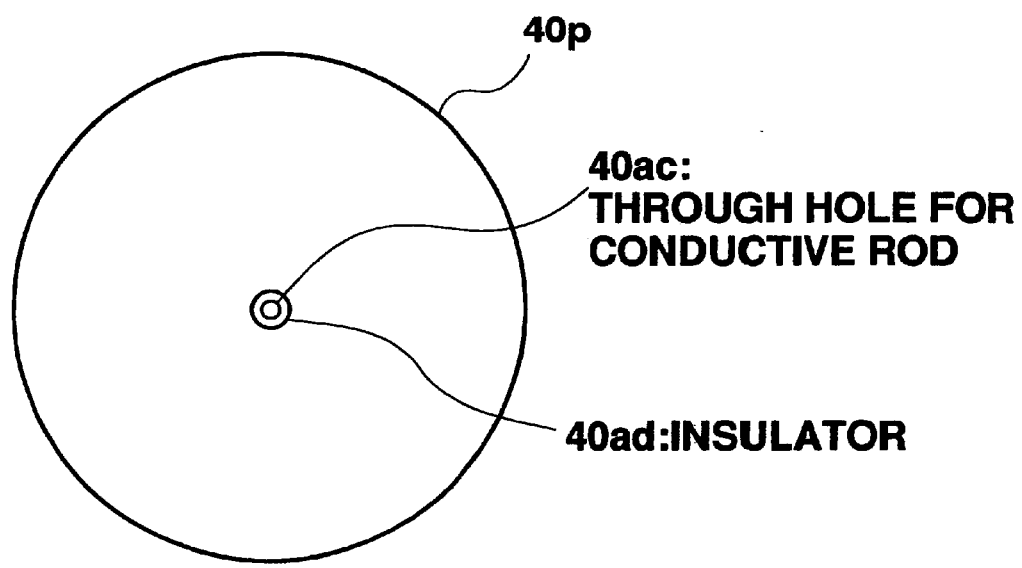
FIG. 11 is a top view of a planar antenna according to the fifth embodiment of the present invention.

Thus, the part of the inner conductor 40y where the meshed conductor 40x is removed, is the fourth embodiment, and the conductive rod 40ab, of the fifth embodiment, respectively serve as the radiator of the VHF whip antenna 40c. The inner diameter of the through hole of the GPS patch antenna 40b can be reduced to about the size of the outer diameter of the coaxial cable 40u in the fourth embodiment. Further, the through hole 40ac for the conductive rod as shown in FIG. 11 can be reduced to the size of the outer diameter of the conductive rod 40ab added by a small gap sufficient enough to provide necessary insulation in the fifth embodiment. This significantly enlarges the available frequency band (which improves the degree of design freedom). It is necessary to use an insulator 40ad to preferably insulate between the conductive rod 40ab and the patch antenna element 40p and, since the through hole 40ac for the conductive rod is small, the outer diameter of the insulator 40ad can also be decreased. In FIG. 11, the insulator 40ad is not drawn to scale.

In the fourth embodiment, there is a risk of breaking the solder at a joint between the inner conductor 40y and the radiator of the VHF whip antenna 40c, or disconnecting the inner conductor 40y where the meshed conductor 40x is removed. In the fifth embodiment, the inner conductor 40y is not extended into the radome 40d, and the inner conductor 40y may be soldered, if necessary, at a point (a joint 40aa) lower than the GPS patch antenna 40b. Therefore, when compared to the fourth embodiment, the fifth embodiment has an advantage that malfunction, such as the disconnection of the inner conductor 40y, can be prevented and that even if such a malfunction occurs, it can be handled easily by relatively simple procedures.

Both the fourth and fifth embodiments attempt to increase and secure the ground surface of the VHF whip antenna 40c by connecting and fixing the meshed conductor 40x of the coaxial cable 40u with the base conductor 40n of the GPS patch antenna 40b. Specifically, in the fourth embodiment, the meshed conductor 40x is soldered near the through hole of the GPS patch antenna 40b so that the meshed conductor 40x electrically conducts with base conductor 40n or with the inner conductor of the through hole which electrically conducts with the base conductor 40n. In the fifth embodiment, the meshed conductor 40x is connected and fixed with the base conductor 40n at the joint 40aa (simultaneously with connecting the inner conductor 40y with the conductive rod 40ab) by using a fastener or a connector or by soldering, in a manner that the meshed conductor 40x electrically conducts with the base conductor 40n. In particular, it is possible in the fifth embodiment to abolish both the inner conductor 40y and soldering of the meshed conductor 40x. This simplifies the step of attaching the coaxial cable 40u, and increases the ease of replacement and maintenance of the GPS patch antenna 40b.

(4) Sixth Embodiment

In the above-described embodiments, the VHF whip antenna 40c and the GPS patch antenna 40b are mounted on the surface of the container 40a of the ADE unit for the AIS 40, and the VHF radio circuit 40e, the controller 40f, the GPS receiver 40g, and the power supply 40h are installed in the container 40a. Alternatively, the present invention can be implemented by mounting or storing other antennas and circuits on the surface of or within the container 40a.

For example, the gyrocompass or the GPS gyro may be provided together with the GPS receiver 40g for acquiring the dynamic information concerning the ship on which the apparatus is installed. The GPS gyro receives the navigation message from a navigation satellite at each antenna of multiple GPS antennas arranged spaced apart from each other. Based on the receiving result, the GPS gyro performs the positioning operations to determine the positional relationship of both antennas, to thereby detect the orientation of a segment between both antennas. Advantageously, the GPS gyro is less susceptible to magnetic fields than the gyrocompass, can be used near the North Pole or the South Pole, can detect the orientation based on the true north instead of the magnetic north, can detect the inclination of the ship body, and is handy. With the GPS gyro, the gyro interface and the calculations for the gyrating speed of the ship become unnecessary.

When it is desired to implement the present invention by applying or modifying the arrangement shown in FIG. 2 so as to incorporate the GPS gyro, multiple GPS antennas, such as patch antennas, are arranged spaced apart from each other on the surface of the container 40a, and then a circuit for calculating the position and the orientation based on the received output of the multiple GPS antennas is installed inside the container 40a. The space required between respective GPS antennas necessary for constituting the GPS gyro is at most about several tens of centimeters. The circuit for detecting the orientation based on the received output of the multiple GPS antennas can be realized by modifying the GPS receiver shown in FIG. 2 (by adding a particular operation routine allowing the calculation of positions and orientations for multiple points). Therefore, even if the GPS gyro is incorporated, the size of the container 40a increases only slightly and the transferably between ships of the container is not significantly affected. It should be noted that the GPS antennas for the GPS gyro can be used for generating PPS signals and detecting positions.

Figure 12:
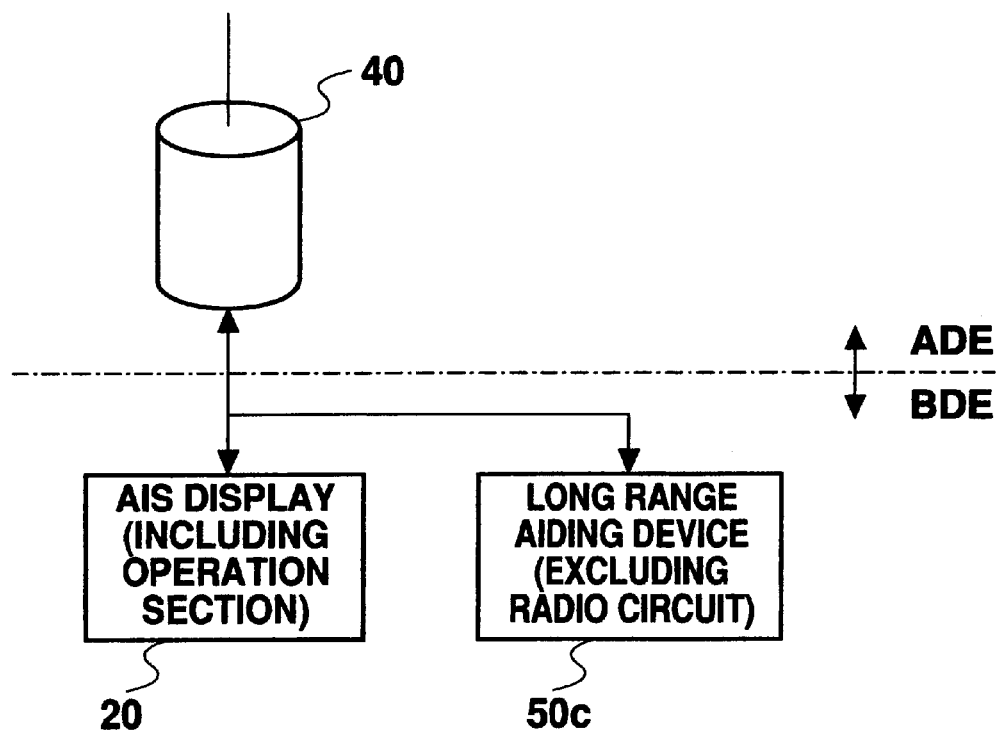
FIG. 12 is a block diagram an arrangement of the shipborne facilities for the AIS, especially the classification of and the connection between respective devices of the ADE and the BDE, according to a sixth embodiment of the present invention.

It is also possible to store a part of the long range aiding device 50, i.e., the circuit related to wireless communications, in the container 40a and mount the associated antenna 50a on the surface of the container 40a. By thus configuring the circuits (especially the controller 40f and the radio circuit related to the long range aiding function) stored in the container 40a so that a part of the long range aiding function is incorporated, advantages similar to those described in connection with the first embodiment can be achieved. Such advantages include taking the navigation assistance from, e.g., INMARSAT-C or ORBCOMM, reducing the number of channels of the inboard transmission path between the ADE and the BDE compared to the arrangement shown in FIG. 14, facilitating the installation and transfer of the facilities, and eliminating long range interface. To incorporate the long range aiding function, an arrangement such as that shown in FIG. 12, for example, is used, in which a part of the long range aiding function corresponding to the interface function for the crew is shown as the long range aiding device 50c.

(5) Supplement

In addition to application to shipborne facilities or the ADE unit, the present invention can also be applied when it is not necessary to output received information. Examples of such applications include a unit for an unmanned station, that is, a waterborne complementary unit for the AIS which is mounted on a waterborne structure arranged fixedly in a certain water area, such as a barge, a lighthouse, or an artificial island, or other floating structures, such as a buoy.

When it is desired to implement the present invention in the above application, the VHF whip antenna 40c can be mounted on the surface of the container 40a and the VHF radio circuit 40e can be stored in the container 40a, in order to transmit and receive the message. With such a configuration, the VHF radio circuit 40e receives the message from surrounding ships or the coast station under the control of the controller 40f, while automatically transmitting a message thereto. The information to be sent includes the static information for classifying or identifying, or indicating the position of a particular waterborne structure or floating structure on which the present invention is installed. If such a waterborne structure or floating structure is an object which experiences significant movement, the current position or the like may be sent as the dynamic information. Because this unit is compact, wherein one or more circuits and antennas are incorporated in a single container, it can more easily be mounted on a buoy or the like than can a unit configured as shown in FIGS. 13 or 14. In addition, the unit may be operated only by feeding power, because received information need not be output.

What is claimed is:

1. An above deck unit for an aotomatic identificaton system contained in shipborne facilities installed on a ship, the shipborne facilities being part of the automatic identification system, comprising:

a container, a messaging antenna mounted on the surface of said container and used for transmitting and receiving a message, said message being communicated automatically on a wireless manner between ships or between a ship and a coast station, said message containing static information, such as a name of a ship, and dynamic information, such as a current position of the ship, a radio circuit stored in said container and using said messaging antenna for transmitting and receiving said message, said container and said radio circuit being externally installed on the ship so as to allow said transmitting and receiving of said message to and from another ship or a coast station, and a controller installed for controlling said transmitting and receiving operations of said radio circuit, said controller supplying information to be contained in said message to the other ship or the coast station to said radio circuit, thereby transmitting said message from said radio circuit, said controller outputting information contained in said message received by said radio circuit from the other ship or the coast station through an inboard transmission path, thereby supplying information to be provided to a crew to an interface means for the crew connected via said inboard transmission path.

2. An above deck unit for the automatic identification system according to claim 1, further comprising a measuring device stored in said container for generating the dynamic information to be transmitted.

3. An above deck unit for the automatic identification system according to claim 2, further comprising a positioning antenna mounted on the surface of said container and used for receiving said position signal, and wherein said measuring device includes a radio determination device for generating the dynamic information including a position of the ship based on a navigation signal received in a wireless manner.

4. An above deck unit for the automatic identification system according to claim 3, wherein said positioning antenna is a planar antenna arranged on the outer surface of said container, said above deck unit for the automatic identification system includes a radome covering said positioning antenna, and said messaging antenna is a whip antenna having a plane of polarization extending orthogonal to that of said planer antenna, said whip antenna having an end passing through said radome and extending externally.

5. An above deck unit for the automatic identification system according to claim 4, wherein said outdoor unit further includes a cable for connecting said whip antenna with said radio circuit, and said planar antenna and said whip antenna have different radiators and share a grounded conductor supplying a ground potential, said cable connecting said whip antenna with said planar antenna configured such that said grounded conductor serves as the grounded conductor for both said planar antenna and said whip antenna.

6. An above deck unit for the automatic identification system according to claim 5, wherein
said container includes a conductive part occupying a part of the surface of said container for electrically conducting with the surface of said planar antenna, said conductive part serving as the grounded conductor of said whip antenna.

7. An above deck unit for the automatic identification system according to claim 5, further comprising
a coaxial cable connecting said whip antenna and said radio circuit, and, a coaxial connector for detachably connecting said whip antenna and said radio circuit, said coaxial connector having an outer conductor connected to the grounded conductor of said planar antenna.

8. An above deck unit for the automatic identification system according to claim 5, wherein
said cable is a coaxial cable having an outer conductor and an inner conductor insulated from said outer conductor, said outer conductor being connected with said grounded conductor and said inner conductor being connected with said radiator of said whip antenna, to thereby connect said whip antenna with said radio circuit.

9. An above deck unit for the automatic identification system according to claim 8, wherein
said coaxial cable has a tip end part where said outer conductor is removed for a predetermined length and said inner conductor is connected with said radiator of said whip antenna, and
said tip end part of said inner conductor serves as the radiator continuing from said radiator of said whip antenna.

10. An above deck unit for the automatic identification system according to claim 8, wherein said planar antenna has a through hole penetrating through said grounded conductor, and said whip antenna has an in-container extension conductor passing through said through hole and extending into said container, said in-container extension conductor connecting said inner conductor of said coaxial cable with said radiator of said whip antenna at a position closer to the interior of said container from said through hole of said planar antenna, said inner conductor of said coaxial cable provided in the interior of said container and extending from said through hole.

11. An above deck unit for the automatic identification system according to claim 4, further comprising
a coaxial cable connecting between said whip antenna and said radio circuit, and a coaxial connector detachably connecting between said whip antenna and said radio circuit,
wherein said radome has a through hole for externally extending one end of said whip antenna to the outside of said radome, and
said coaxial connector seals said through hole in a watertight manner.

12. An above deck unit for the automatic identification system according to claim 1, wherein said container is partly formed by a heat conductor, and said above deck unit for the automatic identification system includes a heat generating member stored in said container for generating heat during operation, said heat generating member being arranged in contact with or in proximity to the inner surface of said container so as to allow heat to be discharged to surrounding air via said container.

13. An above deck unit for the automatic identification system according to claim 1, further comprising
a long range antenna mounted on the surface of said container and used for wireless communications of a long range aiding signal, and
a long range aiding device stored in said container and using said long range antenna for transmitting and receiving said long range aiding signal,
wherein said controller permits said long range aiding device to transmit a portion of the information supplied from said interface means for the crew via said inboard transmission path as said long range aiding signal, while supplying said long range aiding signal received by said long range aiding device to said interface means for the crew via said inboard transmission path.

14. An above deck unit for the automatic identification system according to claim 1, further comprising
a connector for detachably connecting the elements stored in said container with said inboard transmission path, and
a power supply means for feeding power to the elements stored in said container,
wherein said power supply means is formed by one or a combination of one or more of a connector for connecting the elements stored in said container to an external power supply, a cell stored in said container for supplying a discharge output of said cell as a power source to the elements stored in said container, and a generator means associated with said container for supplying a generated power of said generator means to the elements stored in said container.

15. A shipborne facility for an automatic identification system, comprising:
an above deck unit for an automatic identification system according to claim 1,
said interface means for the crew, and
said wired or wireless inboard transmission path.

16. A ship, comprising:
the shipborne facility for the automatic identification system according to claim 15, wherein said ship sails by obtaining a name, a position, of another ship from that ship or from a coast station by transmitting and receiving said message.

17. An above deck unit for the automatic identification system according to claim 1, further comprising a planar antenna mounted on the surface of said container and used for receiving said position signal, and a whip antenna stored in said container for generating the dynamic information to be transmitted.

18. A waterborne complementary unit for an automatic identification system installed on a waterborne structure arranged fixedly in a water area or a floating object floating on the water, comprising:

a container, a messaging antenna mounted on the surface of said container and used for transmitting and receiving a message, a radio circuit stored in said container and using said messaging antenna for automatically transmitting and receiving said message to and from a ship or a coast station, and a controller for controlling said transmitting and receiving operations of said radio circuit, said controller supplying information to be contained in said message destined for the ship or the coast station to said radio circuit, wherein said waterborne complementary unit for the automatic identification system transmits the static or the dynamic information, such as the current position, concerning said waterborne structure or said floating object by transmitting said message.

19. A waterborne complementary unit for the automatic identification system according to claim 18, further comprising a planar antenna mounted on the surface of said container and used for receiving said position signal, and a whip antenna stored in said container for generating the dynamic information to be transmitted.

* * * * *